(No Model.)

S. S. BOGART.
ELECTRIC SELECTING DEVICE.

No. 507,206. Patented Oct. 24, 1893.

WITNESSES:
Edward C. Rowland
James Mackie

INVENTOR
Samuel S. Bogart
by
Price Stuart
ATTORNEYS (No Model.) 5 Sheets—Sheet 2.
S. S. BOGART.
ELECTRIC SELECTING DEVICE.
No. 507,206. Patented Oct. 24, 1893.
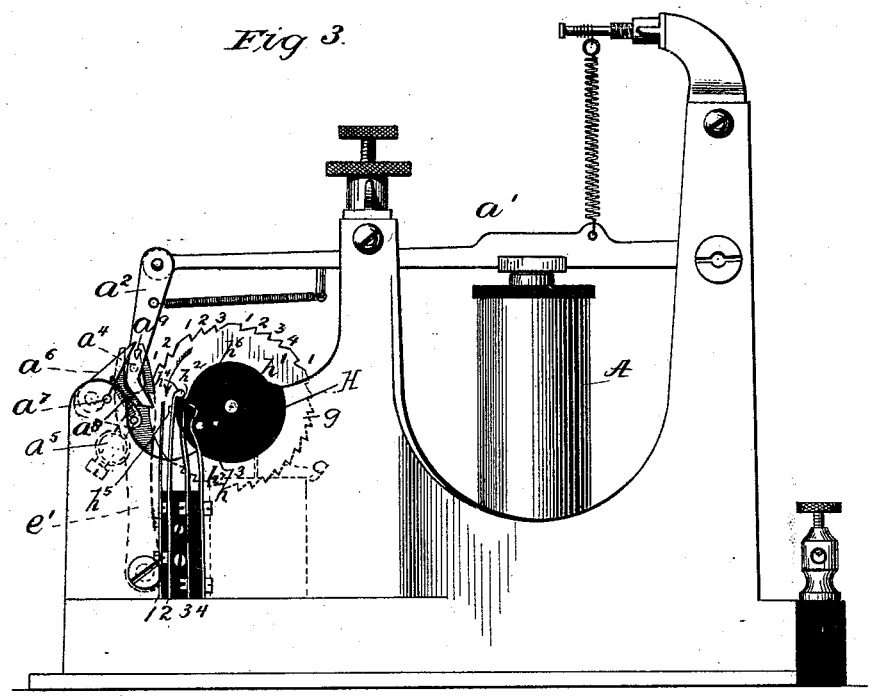
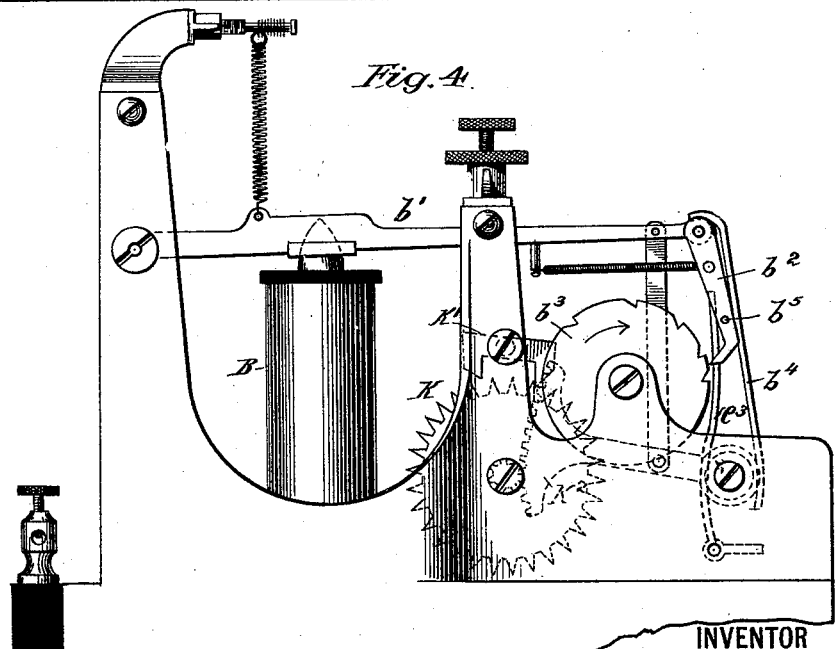
WITNESSES:
INVENTOR
Samuel S. Bogart
BY
Price & Stewart
ATTORNEYS (No Model.) 5 Sheets—Sheet 3.
S. S. BOGART.
ELECTRIC SELECTING DEVICE.

No. 507,206. Patented Oct. 24, 1893.

WITNESSES:

INVENTOR
Samuel S. Bogart
BY
ATTORNEYS

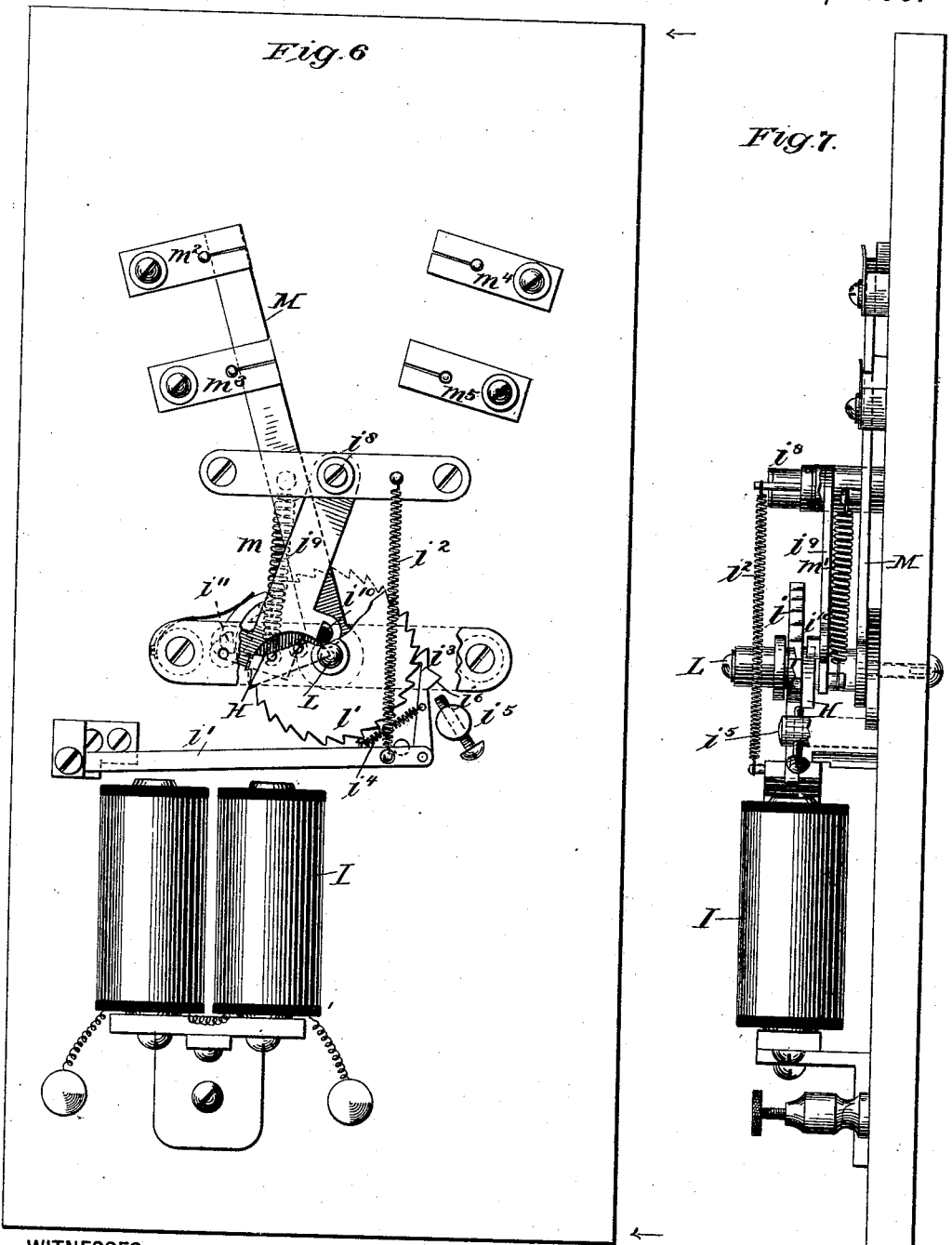

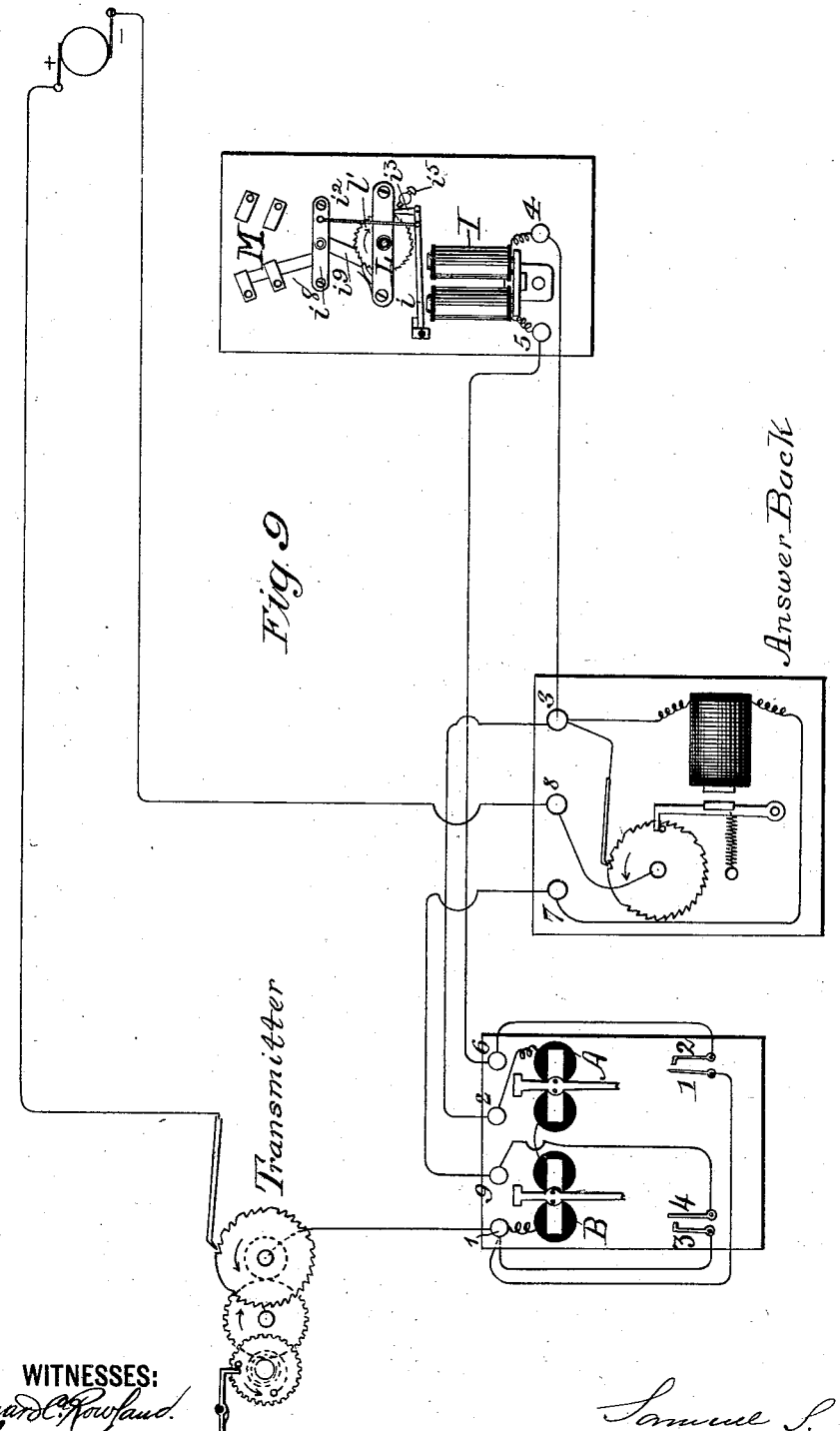

UNITED STATES PATENT OFFICE.

SAMUEL S. BOGART, OF NEW YORK, N. Y., ASSIGNOR, BY MESNE ASSIGNMENTS, TO THE ELECTRIC SELECTOR AND SIGNAL COMPANY, OF WEST VIRGINIA.

ELECTRIC SELECTING DEVICE.

SPECIFICATION forming part of Letters Patent No. 507,206, dated October 24, 1893.

Application filed December 9, 1891. Serial No. 414,490. (No model.)

*To all whom it may concern:*

Be it known that I, SAMUEL S. BOGART, of the city, county, and State of New York, have invented certain new and useful Improvements in Electric Selecting Devices, of which the following is a full specification.

The accompanying drawings illustrate the invention, of which—

Figure 1:
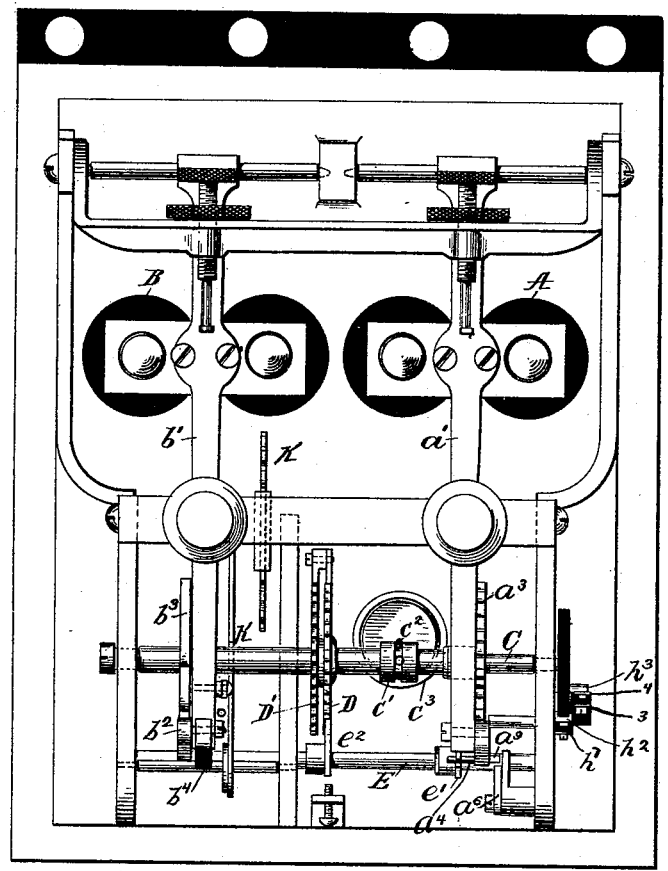
Figure 2:
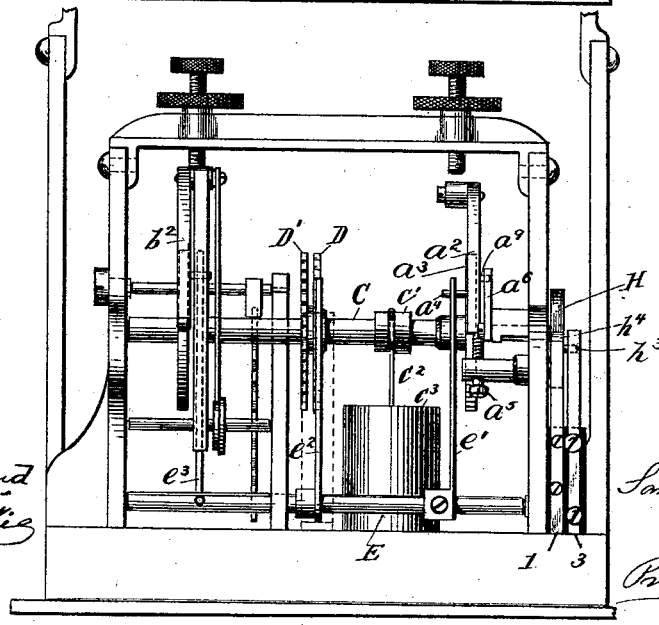
Figure 5:
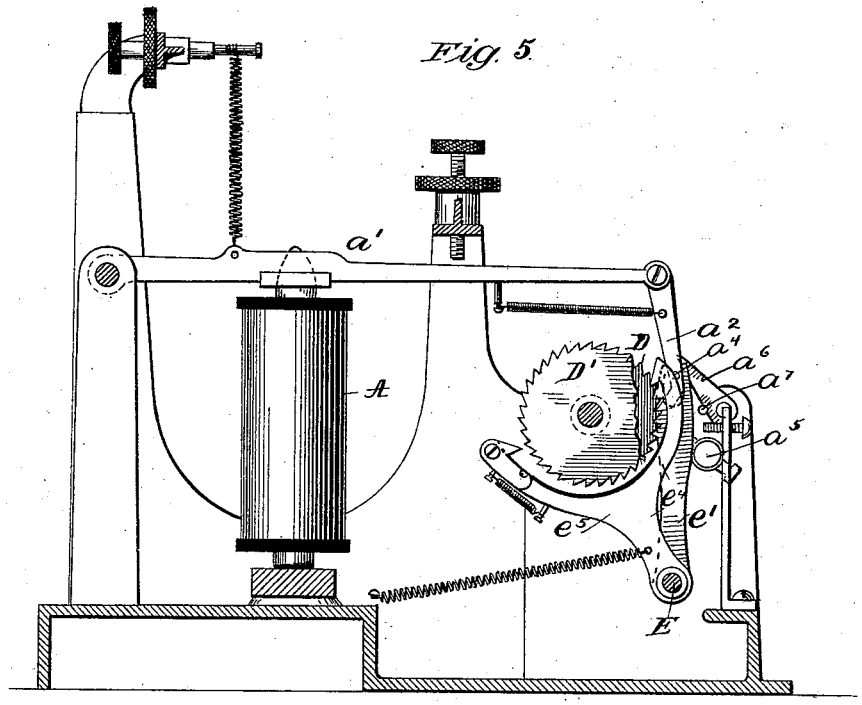
Figure 8:
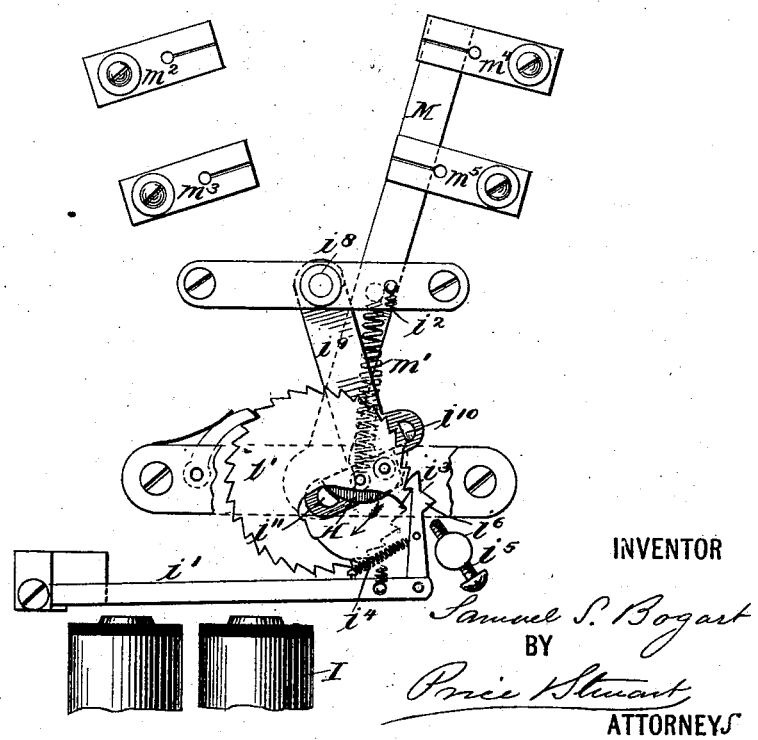

Figure 1, is a plan view of the apparatus; Fig. 2, an end view. Fig. 3, is a side view of the apparatus looking toward the combination wheel. Fig. 4, is a view of the other side looking toward the spacing wheel; Fig. 5, a side view of check wheels with a portion of one wheel broken away; Fig. 6, a front view of a cut-out device; Fig. 7, a side view of the same; Fig. 8, a front view of cut-out device with switch on opposite side of that shown in Fig. 6. Fig. 9, is a diagrammatic view of transmitter, receiving instrument, mechanical apparatus, and answer-back.

In an application heretofore filed, I have shown and described a three-magnet machine, the combination and spacing wheels operated alternately by electrical impulses transmitted through their respective magnets from the front and back stops of the relay, and a check wheel, released by the armature lever of a releasing magnet when the current is shifted to said magnet by completing the phase of the combination or the transmission of a false impulse.

In the apparatus herein described, I have dispensed with the releasing magnet and its armature lever and perform the entire service and function of working the combination and spacing wheels each having a mechanical representation of the impulses required, and positively impelling each by impulses from one stop of the relay, or by the ordinary makes and breaks of a transmitting instrument, while at the same time the wheels are checked at each impulse, and released by mechanism operated by the armature lever of either the combination or spacing magnet. In addition to this I have shown and described a cut-out device operated by the receiving instrument as an example of mechanical work, performed thereby, when its phase is completed and the instrument prepared for such work.

On a suitable base are erected the two magnets A and B provided with their armature levers $a'$ and $b'$, and their pawls $a^2$ and $b^2$ as shown in Figs. 1, 2, 3 and 4. The letters A, $a'$, &c., refer to the combination magnet, lever, and pawl; and B, $b'$, &c., to the spacing magnet, lever and pawl. The combination wheel $a^3$, and the spacing wheel $b^3$ are mounted as shown in the figures on the same shaft C, so that each wheel may be positively impelled by its appropriate armature lever and its pawl, or the checking devices released as the instrument responds to the impulses transmitted. On the same shaft C, are placed the check-wheels D, D', (see Figs. 2 and 5,) each having ratchets on its periphery the teeth of which are cut with their radial faces in opposite directions, for a purpose to be fully explained. On the shaft C is also a drum $c'$, and to the drum a chain or cord $c^2$ is attached to be wound thereon when the shaft is turned in working out the combination; and at the other end of the chain there is attached a weight which rises or falls in a guiding well $c^3$, and as it falls returns the wheels to zero when the check-wheels are released; a spring would answer the same purpose. Now as the magnets receive their current through one stop of the relay, or by direct makes and breaks of a transmitter, it follows that when an impulse is given, the current is through the coils of both magnets, and consequently the armature levers and their pawls both move together.

In Fig. 4, there is shown an escapement mechanism with its detent marked K, K', K², connected with the armature lever of the spacing magnet, and its purpose is to retard or give a slow movement to that lever; these escapement mechanisms are so well known that no further description of them is required. It will therefore be seen that the armature lever of the combination magnet responds quickly to the impulse, while that of the spacing magnet responds slowly. Thus an impulse will at once impel the combination wheel one tooth, and if it be prolonged will also impel the spacing wheel and shaft C one tooth so that the combination and spacing wheels secured to the same shaft co-operate together and are operated by long and short impulses from the transmitting instrument.

Upon the combination wheel $a^3$, an exact mechanical representation of the combination of each instrument is constructed, stamped, erected or cut, leaving a space between the members thereof: and upon the spacing wheel an exact mechanical representation of the spaces between the members of the combination is placed; as shown in Figs. 2 and 4, and in addition to the mechanical representation of the combination on the wheel $a^3$, and beyond them, there is a series of ratchets which come into operation when the phase of the instrument is completed for a purpose fully explained hereinafter.

By reference to Fig. 3, it will be seen that the combination there shown represents the following impulses: 1, 2,—1, 2,—1, 2, 3,—1, 2, 3, 4,—1. As will be seen these are members, separated by spaces between them, and each of these spaces is represented by a raised piece about flush with the outer limit of the teeth of the members forming the combination. Now to work out this combination, the operator gives impulses as follows: 1, 2, which lodges the pawl $b^2$, behind tooth 1 of the wheel $b^3$, still holding his finger on the key the pawl $b^2$ acts and slowly turns the wheels until the pawl $a^2$ lodges at 1, on the next member; then 1, 2, again lodging pawl $b^2$, on the tooth of the wheel $b^3$, when a prolonged impulse lodges pawl $a^2$ on the first tooth of the next member of the combination wheel; then impulses 1, 2, 3, the latter prolonged; then 1, 2, 3, 4, the fourth a long one; then 1, when the phase of the combination is completed, and the instrument ready to perform work.

The instrumentalities by which the wheels are returned to zero, I will now explain. They may be actuated by the armature lever of either the combination or the spacing magnets. A rock-shaft E, is suitably journaled in the frame, to which is secured the arms $e'$, $e^2$, $e^3$. The center or middle arm is forked or branched, and the branches are shown at $e^4$, $e^5$, (Fig. 5;) a hook on the end of the arm $e^4$ serves as a pawl to the ratchets of the wheel D, which checks the shaft at each impulse and prevents it from returning backwardly, and a spring pawl on the end of the branch $e^5$, co-operates with the ratchets on the wheel D', and prevents the impulses from turning the wheels too far. Thus the forward movement of the wheels is checked by the spring pawl on the end of branch $e^5$, and the backward movement by the pawl or detent on the end of the branch $e^4$; the arm $e'$ (see Fig. 3) is slotted at the top, and a pin as $a^4$, secured to the pawl $a^2$, plays within this slot while the pawl is at work responding to the combination impulses. A set screw or other suitable stop as $a^5$, limits the downward movement of the pawl $a^2$; secured or pivoted to a suitable part of the frame is the piece $a^6$ of suitable form; as shown in the drawings it is in the shape of a wedge. It may be provided with a suitable stop and spring as $a^7$ and $a^8$, so that it may lift as the pawl rises and return to its stop when it is free, and on the pawl $a^2$ is placed the pin $a^9$; now it is evident that this pin will escape the end of the wedge-shaped piece as the pawl descends. When the pawl is in one of the notches or teeth which form the members of the combination on the wheel, but should the pawl descend while its lower end is sliding on one of the raised spaces between the members of the combination, this pin strikes upon the upper surface or inclined plane of the wedge-shaped piece, throwing the pawl outwardly as it descends; this movement causes the pin $a^4$ to throw out the arm $e'$, and rock the shaft E; as this shaft is rocked it releases the branch arm $e^4$ from the wheel D and the pawl $b^2$ from the spacing wheel, when the weight drops and returns the instrument to zero; thus when the pawl $a^2$ acts to release the check-wheel it would respond to a false impulse. Now as the pawl $b^2$ on the end of the spacing armature lever $b'$, frequently descends and slides upon the raised spaces between the members of the combination when proper impulses are given, it cannot be arranged so that it may always throw out the catch-pawls and release the wheels whenever it so descends; consequently I have made another arrangement to release the wheels by the operation of this lever and pawl (see Fig. 4); suitably secured on the end of the armature lever is the bar or rod $b^4$; when one of the prolonged impulses is given to turn the combination wheel until the combination pawl rests on the first tooth of the next member behind the one just operated. The impulse should stop when this is accomplished; but if it should be too long, the bar $b^4$ continues to descend until its lower end strikes the arm of the rod $e^3$, the upper end of which strikes a pin $b^5$ on the pawl $b^2$, throwing out the pawl and at the same time, turning the rock-shaft E, releasing the pawl $a^2$ and the check-wheels. In connection with this combination lock, I have arranged a cut-out for an arc-light as shown in the drawings. In the place of this cut-out there may be substituted other mechanical device or devices to be operated by instrumentalities of the lock, such as a semaphore for example; and this work may be accomplished by continuing to send electrical impulses through the lock when the phase of the instrument is completed.

As already stated, the wheel or sector is provided with a mechanical representation of the combination, and beyond the members of this combination a series of teeth or ratchets to be operated in the same way, viz: by impulses transmitted through the coils of the operating magnet; these ratchet teeth are shown at $g, g$. (See Fig. 3.) They may be of any number sufficient to accomplish the work or more than the number required for this purpose. For example, the combination wheel shown in the figure is provided with fifteen of these teeth, but the work required for operating the cut-out or other mechanical device may be performed by any number less than the whole, say—six, eight or ten impulses which impel the wheel a distance equal to six, eight or ten teeth. The remaining number of teeth are then operated and impelled to the end, at which point the answer-back is set off which returns a message to the operator to inform him that the lamp has been lighted or extinguished or that the semaphore has been properly worked.

The mechanism for sending the current to the coils of the operating magnets of the cut-out or semaphore and to the answer-back, may vary according to the special construction of each machine.

Contact brushes may be arranged at one or both ends of the shaft, but as a simple and convenient arrangement I have shown the contacts for these purposes grouped at one end of the shaft and operated by the mechanism there shown. Upon the end of the shaft C is secured the cam H. It may be described as made in the form of two concentric circles, the outer one being about or a little more than a half circle, the ends of which run toward the inner circle by inclined planes, shown at $h'$, $h^2$; this wheel is also provided with a pin as $h^3$; suitably arranged and insulated from each other are the switch brushes 1, 2, 3, 4, (see Fig. 3.) The brushes 1 and 2 co-operate to control the current to the cut-out device, and 3 and 4 co-operate to control the current to the answer-back, and by the arrangements of the instrument they are set to perform their respective services when the sectors of the lock are in such positions as to require this service.

The brush 2 is slightly bent at its upper end where it may be provided with a knob or roller as shown at $h^4$ and below this, I have provided the brush with the contact point $h^5$. The brush 4 is also suitably bent or curved at the top as shown at $h^6$, so that when it is struck by the pin $h^3$, the brush will contact with its colleague 3; and below its upper end it is curved inwardly as at $h^7$, and when the pin $h^3$ reaches this point, the brushes 3 and 4 are separated. Now in Fig. 3, the combination wheel or sector is shown at zero, ready to receive the combination impulses. The wheel is turned by these impulses until the combination phase is completed. This brings the cam H around until the point $h'$ strikes the knob $h^4$ on brush 2, and this occurs just at the end of the last member of the combination; the brushes 1 and 2 are thus contacted and the current shunted to the operating magnet of the cut-out, and the lock is now in position to receive the impulses to operate the cut-out; six or eight of these impulses are usually sufficient for this purpose. Other impulses are then given until the pin $h^3$ has closed the brushes 3 and 4. This sets off the answer-back, and the operator at the station knows that the cut-out has been operated. When this occurs the spacing wheel has also been turned and the pawl $a^2$ has been sliding upon the long uncut space between the extreme ends of its members. Now a long impulse is given; the armature $b'$ descends, operates the arm $e^3$ and rocks the shaft E, releasing check wheel D and pawl $a^2$; the stored force in the spring or weight then returns the device to its starting point.

The mechanism for operating the cut-out and the manner in which it is combined with the combination lock, I will now describe. Viewing Figs. 6 and 7, I is an electro-magnet provided with its appropriate armature lever $i'$, and retractile spring $i^2$; a pivoted pawl $i^3$, provided with its spring $i^4$, is placed at the end of the lever and reciprocates therewith; suitable stops as $i^5$, $i^6$, limit the downward movement of the lever and pawl. Suitably journaled in the frame is the shaft L, and on this shaft is the ratchet wheel $l'$, usually provided with a proper pawl or checking device; when the cam H in the lock instrument (Fig. 3) has reached a point where the switch brushes 1 and 2 are closed, the current is shunted to the cut-out magnet I, and hence with each impulse given to the armature lever of the combination magnet, a corresponding impulse is given to the armature lever of the cut-out magnet I. Thus the combination wheel and the cut-out wheel turn together from the end of the combination impulses. From a suitable bar as $i^8$ is swung the arm $i^9$, and attached to the free end of this arm are the pins or lugs $i^{10}$, $i^{11}$, (see Figs. 6 and 8;) secured to the wheel and turning therewith is an arch or crescent shaped piece which bears against one of the lugs, and when the wheel revolves, forces the free end of the arm $i^9$ to the other side. Journaled to a suitable shaft which may be the shaft L, is the switch lever M, and the spring $m'$ is atached to the switch lever at one end and to the free end of lever $i^9$ at the other. The upper end of this switch lever contacts with the switch brushes $m^2$, $m^3$, on one side, and $m^4$ and $m^5$, on the other. As this lever is moved, one end of the spring moves with it, increasing the tension on the spring. As it moves the angle of the spring to the lever changes and as the angle changes and the force of the spring increases, it finally arrives at a point when the strain will suddenly throw the switch lever to the other side; this occurs when some six or eight of the impulses have been given; the remainder of the impulses are then given, at the end of which the combination wheel is restored to zero, as already described, at which point the crescent shaped piece is upside down as shown in Fig. 8, and prepared to actuate the lug $i^{11}$, to return the lever to its original position. A repetition of the impulses from the beginning will produce the reverse action of the switch or semaphore.

Although the devices may be connected up in a number of ways, I will describe the courses of the currents as they run in the way selected for illustration. Fig. 9 will serve for this purpose. In this figure I have shown no local circuits and work the device direct from the main line without the interposition of a relay.

When in normal condition with the apparatus ready to work the current, beginning from one pole of the battery for example the positive pole, runs thence to the brush of the transmitter and through its combination wheel to binding post 1 of transmitting instrument, through magnets B and A to binding post 2, thence to binding post 3 of answer-back, and through answer-back brush and wheel to binding post 8, and thence to the other pole of the generator; thus the transmitter and selector are in circuit and ready to impart and receive the impulses to perform the required work; when the combination wheel has completed the combination and has caused brushes 1 and 2 to contact with each other, the cut-out magnet is brought into the circuit, and the current following the same course from the positive pole of generator to binding post 1 of the selector runs thence to brushes 1 and 2, binding post 6, thence to binding post 5 of cut-out device and through its magnets and out at binding post 4 to binding post 3 of answer-back, through its brush and wheel to binding post 8, and out to the other pole of generator. The cut-out device is now ready to be operated by impulses from the transmitter. When these impulses are given the pin $h^3$ closes the brushes 3 and 4, and sets off the answer-back. The current then following the same course from the positive pole of the generator to binding post 1 of selecting instrument runs thence to springs 4 and 3, thence to binding post 9, thence to binding post 7 of answer-back through its magnet, to binding-post 3, thence through brush and wheel to binding post 8, and out to the other pole of generator. When the parts are returned to normal position as already described, the current follows the course first described. Should a relay be interposed in the circuit for use in telegraph service, the action of the transmitter would be through the magnets of the relay, operating its armature in whose local circuit the selector would be placed.

Having now described my invention, what I desire to secure by Letters Patent, is—

1. In an improvement in electric selecting devices, a wheel or sector provided with a mechanical representation of a fixed combination of electrical impulses, an electro-magnet provided with an armature lever and its pawl to impel the wheel and work out the combination in response to the electrical impulses, in combination with a checking mechanism to hold the wheel or sector at each forward movement and prevent it from returning backward, and mechanical devices operated by the armature lever and its pawl to release the checking mechanism when a false impulse is transmitted.

2. In an improvement in electric selecting devices, two wheels or sectors mounted upon the same shaft, one provided with a mechanical representation of a fixed combination of electrical impulses consisting of a series of members with intervening spaces, and the other provided with a mechanical representation of the spaces between the members of the combination wheel or sector, in combination with a checking mechanism to hold the wheels at each forward impulse, two electro-magnets and their appropriate armature levers and pawls to work out the combination in response to the impulses transmitted and means operated by either magnet to release the checking mechanism and means for returning the wheels or sectors to the starting point when released.

3. In an improvement in electric selecting devices, adapted to respond to a fixed combination of electrical impulses, a checking device consisting of two wheels having teeth or ratchets with their radial faces cut in opposite directions, in combination with two pawls co-operating with the wheels, one to limit the forward stroke and the other to prevent a backward return of the wheels, means operated by the electrical impulses for releasing the checking device when a false impulse is transmitted or when the combination has completed its phase and means for returning the instrument to its starting point when the checking device is released.

4. In an improvement in electric selecting devices, adapted to respond to a fixed combination of electrical impulses, a wheel or sector provided with a mechanical representation of the combination impulses consisting of a series of members with a raised space between them; an electro-magnet with its armature lever and pawl to work out the combination in response to the impulses, a checking device to prevent the backward movement of the sector, and means operated by the sliding of the pawl on the raised space between the members of the combination for releasing the checking device to allow the instrument to be returned to starting point.

5. In an improvement in electric selecting devices, adapted to respond to a fixed combination of electrical impulses, the instrument provided with a mechanical representation of the electrical combination impulses and means for working them out and also provided with a wheel or sector having a series of teeth or ratchets, in combination with mechanism for operating a cut-out or semaphore, having a wheel or sector provided with a series of teeth or ratchets corresponding with those in the combination instrument, and means for working the wheels in unison after the phase of the combination instrument is completed.

6. In an improvement in electric selecting devices, a wheel or sector adapted to respond to a fixed combination of electrical impulses, and also to a series of additional impulses to complete the course, means for transmitting to the instrument, first the fixed combination of impulses, to the receiving instrument, and then the additional impulses to complete the phase of the wheel, in combination with a mechanical device operated by the additional impulses, transmitted after the combination impulses.

7. In an improvement in electric selecting devices, a wheel or sector adapted to respond to a fixed combination of electrical impulses, and also to a series of additional impulses to complete its course, in combination with a mechanical device adapted to respond to a series of impulses to perform mechanical work, a transmitting instrument, and means for transmitting first the fixed combination of electrical impulses to the receiving instrument, means for shunting the current to the electro-magnet of the mechanical device, and then the additional impulses to perform mechanical work.

Signed at New York city, in the county of New York and State of New York, this 28th day of November, A. D. 1891.

SAML. S. BOGART.

Witnesses:
C. P. MACKIE,
WM. C. COX.